Sept. 16, 1930. H. S. CHASE ET AL Re. 17,797
CONTROL FOR LOCKS OR THE LIKE
Original Filed Jan. 24, 1924 3 Sheets-Sheet 1
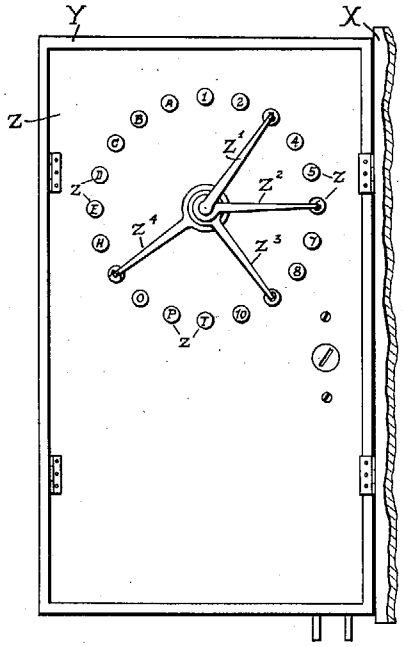
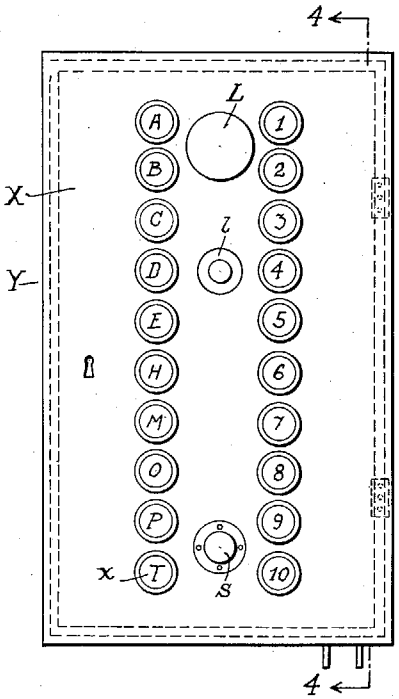
INVENTORS
HORACE S. CHASE
WILLIAM R. FLETCHER
BY Newell & Spencer
ATTORNEY Sept. 16, 1930. H. S. CHASE ET AL Re. 17,797
CONTROL FOR LOCKS OR THE LIKE
Original Filed Jan. 24, 1924 3 Sheets-Sheet 2
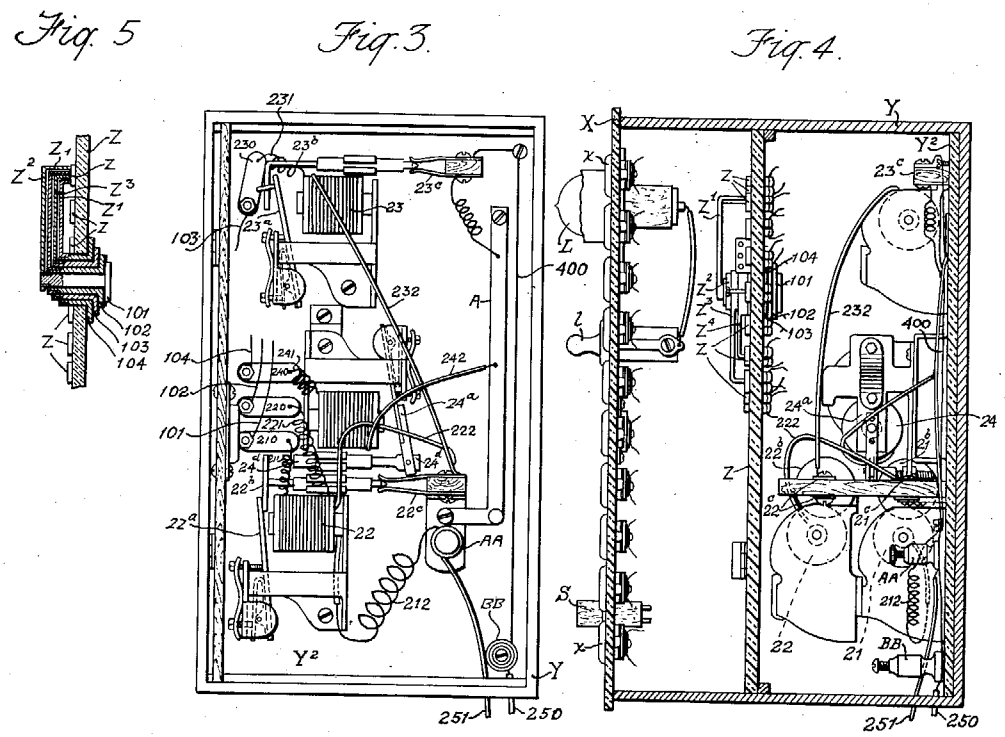
INVENTORS
HORACE S. CHASE
WILLIAM R. FLETCHER
BY Newell & Spencer
ATTORNEY Sept. 16, 1930. H. S. CHASE ET AL Re. 17,797
CONTROL FOR LOCKS OR THE LIKE
Original Filed Jan. 24, 1924 3 Sheets-Sheet 3
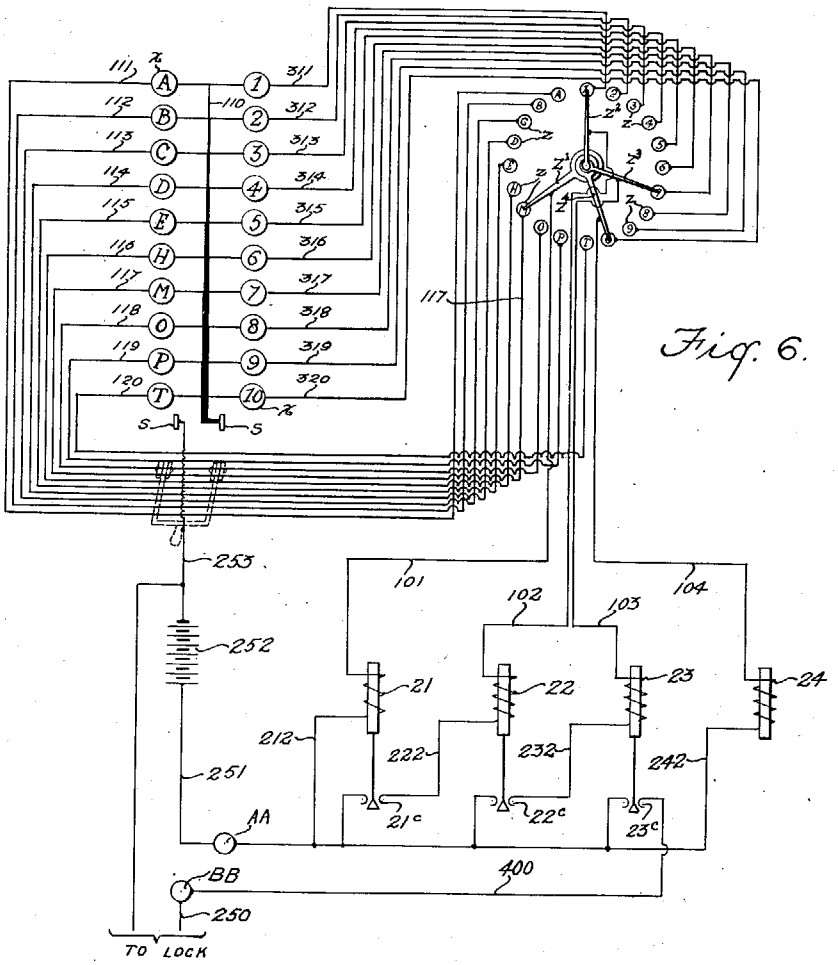
INVENTOR
HORACE S. CHASE.
BY WILLIAM R. FLETCHER.
Newell & Spencer
ATTORNEY Reissued Sept. 16, 1930 Re. 17,797

UNITED STATES PATENT OFFICE

HORACE S. CHASE AND WILLIAM R. FLETCHER, OF NEW YORK, N. Y.; SAID FLETCHER ASSIGNOR, BY MESNE ASSIGNMENTS, TO SAID CHASE

CONTROL FOR LOCKS OR THE LIKE

Original No. 1,724,792, dated August 13, 1929, Serial No. 688,302, filed January 24, 1924. Application for reissue filed April 12, 1930. Serial No. 443,899.

Our present invention relates to systems of combination controls such as door locks and the like. We take as an example a situation which may be profitably considered as involving a characteristic problem and a practical solution therefor.

In large hotels, apartment houses and the like great difficulty has been experienced with room or apartment keys. There is, first, the serious annoyance due to the loss of keys, and the very serious problem involved in the ease with which hotel keys may be duplicated for unlawful purposes. There is furthermore the difficulty in such States as require that a room be locked against a guest or tenant who has not paid his bill, and other and various difficulties and complications too numerous to mention but all of common experience. A great variety of solutions have been attempted but so far the usual hotel and apartment house is fitted out with key locks and the ancient troubles continue to persist.

Our invention contemplates a control for a lock by which a combination feature is introduced. Ordinarily combination locks are difficult to set and are difficult for the average individual to manipulate while affording little difficulty for the skilled crook to work. In accordance with our invention a combination is very readily set and very easily operated by anyone having the combination. It provides a number of advantages and possibilities. These will be pointed out further in the specification as we proceed to the discussion of an embodiment of our invention which we have selected as illustrative. This we show in the accompanying drawings throughout which and the specification reference characters are employed in the usual manner. In the drawings:—

Fig. 1 is a front elevation of our combination box.

Fig. 2 is a view of the inner door or panel of the same.

Fig. 3 is a view of the box interior.

Fig. 4 is an elevation of the box with a side removed.

Fig. 5 is a detail section of the dial hands, and

Fig. 6 is a diagrammatical indication of the system and its wiring.

Our system in the embodiment shown comprises three general factors which may first be considered in regard to the general function. In Fig. 1 is shown the outer face of door X of a wall cabinet Y. This door X is in fact a panel carrying two columns of push buttons $x$ there preferably being ten or more buttons in each column. In one column the buttons are preferably assigned numbers and in the other letters by which the individual buttons may be designated. These buttons constitute an exposed key board by which the guest or other person authorized to enter the room may close, in the control system, certain predetermined circuits which have been selected to constitute the combination on which the control is set to work.

As will hereafter be explained more in detail, each of the buttons $x$ is wired in on an independent line which is connected with a battery or other sort of electrical energy so that when a button is pressed its line is energized and if that line has been selected for inclusion in the combination the current will be transmitted into the control system.

The various lines from the buttons $x$ are each connected with one of the contact points $z$ set as a dial on the inner door or panel Z. This dial is in effect a four-bladed switch, the dial form being found convenient both on account of compactness and ease in setting. The dial has four arms $Z^1$, $Z^2$, $Z^3$, $Z^4$, which are arranged somewhat after the manner of the hands of a clock and are of such length that each hand may contact with any one of the points $z$. These hands have posts each insulated from the other and passing through the plate on which they are mounted and are each separately wired to one of the actuated elements of the system. By setting these hands on different predetermined points $z$ as indicated by the number or letter assigned any combination of four or less letters or numbers may be provided for so that when the selected buttons are pressed each button circuit is connected through the dial with one of the actuating devices of the system.

At this point it should be noted that in order to prevent the working of the combination by experiment we have provided in our system means necessitating a predetermined sequence of operation of the buttons in order to obtain a successful actuation of the lock. This leads us to a brief consideration of the actuating mechanism by which the lock is opened.

In any concealed and protected location, but preferably within a wall box such as Y, we arrange a battery of electro-magnets. In the four element combination form shown we provide four of such electro-magnets 21, 22, 23, 24. Of these the magnets 21, 22 and 23 operate the switches $21^c$, $22^c$, and $23^c$ respectively.

The winding of the magnets 21 and 24 are connected directly back to the battery or other source of electrical energy; while the windings of the magnets 22 and 23 are respectively connected back to the battery through the switches $21^c$ and $22^c$. The switch $23^c$ operated by the last magnet 23 of the combination controls the lock-operating circuit. The switches are operated by the armatures $21^a$, $22^a$, and $23^a$ so that when each magnet is energized in its proper turn a circuit is built up through the series to the final magnet 23.

The armature $23^a$ of the magnet 23 is pivotally connected to the switch pin $23^b$ so that the latter will be pushed into position to connect the leaves of the switch $23^c$ when the magnet 23 is energized, and will be withdrawn by the armature $23^a$ so as to disconnect the switch $23^c$ when the armature is released by the magnet 23. Similarly the push bar $24^d$ is pivotally connected to the armature $24^a$ so that it will be moved forward under the influence of the energized magnet 24 and back under the influence of the spring which holds the armature $24^a$ when the latter is released from the magnet 24. The switch pins $21^b$ and $22^b$, on the contrary are not connected to their respective armatures $21^a$ and $22^a$ but merely rest against them. Thus, when either of the armatures $21^a$ or $22^a$ is drawn toward its magnet 21 or 22 it pushes the corresponding switch pin $21^b$ or $22^b$ into position to form a connection between the leaves of the corresponding switch $21^c$ or $22^c$. However, when the armature is released and returned to its released position by means of its supporting spring it does so without affecting the position of the switch pin $21^b$ or $22^b$. Thus the switch $21^c$ or $22^c$ remains closed until its switch pin is moved away from contact with its leaves by the operation of the push bar $24^d$.

The armature of the last magnet 24 operates a kick-off for the first two switches thus breaking the established combination circuit. If it be desired to leave the combination established the fourth button of the combination is not pressed. Until the fourth button is pressed the lock may be operated by simply pressing the third button of the combination.

For the purposes of the present disclosure it will be understood that the actual lock of the door may be of the usual magnetic type in which a small electro-magnet is energized to withdraw a catch, so that if the circuit is established the third button operates the door catch just as the single button operates it in ordinary installations.

The above constitutes the general elements in the form of our invention chosen for discussion herein. We will now describe the various parts more in detail.

As before described, the panel X, Fig. 1, may conveniently constitute the door of a wall box Y which may be set conveniently adjacent the door frame or in the frame itself. In addition to the push buttons *x* it is preferably provided with a small electric light L which may be switched on and off as by the switch *l*. Adjacent the bottom of the door we preferably also provide a switch S which is cut in on the wiring, as will be hereinafter described, so that if desired the current may be cut off and the system thrown out of commission.

Referring to Fig. 4 which is an elevation of the box with side removed, it will be seen that the inner panel or door Z is set somewhat within the box or cabinet and spaced from the panel X sufficiently to give clearance for the dial hands $Z^1$, $Z^2$ $Z^3$, $Z^4$. The hands are so formed that they may pass each other and yet each one may be brought into contact with any one of the contacts *z*. The posts of the hands are concentrically nested as shown in Fig. 5, and insulated from each other and each one is connected by a line, as at 101, 102, 103, 104, with its corresponding electromagnets 21, 22, 23 and 24.

The magnets themselves as appears from Fig. 3 and side elevation of Fig. 4, may be conveniently arranged on the back of the wall box, or more conveniently on a removable panel $Y^2$. The magnets 21 and 22 are arranged adjacent with their armatures $21^a$, $22^a$ similarly disposed.

In closing, each of the armatures $21^a$, $22^a$ and $23^a$ operates a switch pin as $21^b$, $22^b$, disposed in alignment with a pair of spring contact lips as $21^c$, $22^c$. The magnet 23 has its armature connected with a switch pin $23^b$ aligned with a pair of spring lips $23^c$ while the armature of the magnet 24 is connected to a kick off or push bar $24^d$ the head of which is adapted to engage the flanges of the switch pins $21^b$, $22^b$, so as to withdraw the switch from between its contact lips and separate the armatures $21^a$, $22^a$ of the magnets 21 and 22 from the adjacent poles of the magnet cores. It is therefore the function of the magnet 24 to break the circuit which has been built up and thus leave the door lock inoperable until the combination has again been built up.

This kick off or circuit breaker also serves as a factor in case of attempt to work the combination by experiment, because if the button controlling the magnet 24 be pressed out of turn it immediately breaks any circuit that has previously been established.

Referring now to the diagrammatical showing of Fig. 5, it will be seen that the system shown is wired as follows: Each one of the push buttons *z* is connected on one side with a common battery line 110 which is interrupted at S by the switch hereinbefore described. The other side of the buttons are wired, as at 111 to 120 and 311 to 320 inclusive, to their respective contacts *z*. As before explained, the dial hands $Z^1$, $Z^2$, $Z^3$, $Z^4$, are wired through respective lines 101, 102, 103, 104 to their respective magnets, the line 101 leading to the winding of the magnet 21, the line 102 leading to the winding of the magnet 22, the line 103 leading to the winding of the magnet 23, and the line 104 leading to the winding of the magnet 24. The other end of the winding of the magnet 21 is led through a wire 212 to the ground strip A connected back to the battery 252 through the binding post A—A. The winding of the magnet 22 is similarly connected through the wire 222 and the switch $21^c$ and binding post A—A back to the battery. Since the switch $21^c$ is open until the magnet 21 has been operated obviously the winding of the magnet 22 cannot be energized until after the operation of the magnet 21. Similarly also the winding of the magnet 23 is connected through the wire 232 and the switch $22^c$ and binding post A—A back to the battery. Thus, if the magnets 21 and 22 have been previously energized so that the switch $22^c$ is closed the operation of the button 10 will serve to close the circuit through the winding of the magnet 23 and thus to close the lock-operating switch $23^c$. If, however, the switch $22^c$ has not previously been closed the button 10 does not control the circuit; and even though the button 10 is operated to close its switch, nevertheless the circuit remains open at the switch $22^c$ so that the operation of the button 10 is of no effect. The winding of the magnet 24 is connected directly to the ground strip A and thence back through the binding post A—A to the battery 252.

The main lock circuit we have indicated as connected in on the switch $23^c$ one leaf of which is electrically connected to the binding post A—A and the other to the binding post B—B. The binding post B—B is also connected to the line 250 which leads to the door latch operating mechanism and from thence back to the battery 252 e. g., through the line 253. The binding post A—A is also connected to the line 251 which leads to the opposite pole of the battery 252 and thus completes the circuits through the magnets 21, 22, 23 and 24.

In the form shown in Figure 6 we have diagrammatically illustrated a series of push buttons as indicated at *x*. In the form shown, the right hand column of buttons carry number indications which may be in sequence or otherwise, and the left hand series carry letter identifications. This use of both numbers and letters has some advantage but the push buttons may be given any character indications, or colors, or other differentiation may be used.

One side of each button is connected by a common wire to a battery lead 110, which is preferably interrupted by a switch of any form from which the line 253 leads to the battery 252. From the batteries the line 251 leads to the binding post A—A, Fig. 3, from which it will be seen that it connects directly with the windings of the magnets 21 and 24.

In Figure 3, we have indicated the line 241 as the connection of the winding of the magnet 24 with its own binding post 240 through which it is connected by the line 104, dial arm $Z^4$, its contact point M and the line 117 with the button M. This constitutes a characteristic circuit by which the wiring plan will be understood.

It is now desirable to consider the arrangement by which the proper sequence of actuation is compelled. Take, for example, the first number, 1, of the given combination, 1—7—10—M. We have indicated the line 311 running from the button *x* to the corresponding contact point $l^z$ on which the arm $Z'$ is positioned. This arm is connected, as indicated, by line 101 with one end of the winding of the magnet 21. The other end of the winding of the magnet 21 leads by a line 212 to the ground strip A and thence through the binding post A—A and the return lead 251 back to the battery 252. Similarly the corresponding ends of the windings of the magnets 22 and 23 are connected back to the battery, but only through the switches $21^c$ and $22^c$ respectively controlled by the preceding magnets of the combination. In Figures 3 and 4 the lines 101, 102, 103 and 104 are shown as connected to suitable binding posts indicated by the numbers 210, 220, 230 and 240 respectively and from these binding posts the windings of the magnets 21, 22, 23 and 24 are connected by short leads 211, 221, 231 and 241 respectively. These, however, are only for convenience in the set-up and for simplicity have not been separately indicated on the wiring diagram shown in Figure 6.

It will thus be seen that the main line connection which is established by the actuation of the electro-magnet 23 through its switch $23^c$, one side of which is connected to the battery and the other side of which is connected by the line 400 to the binding post B—B can only be established by a pressing of the buttons 1, 7 and 10 in the proper order and without pressing the button M out of its order. The button M is not to be pressed until the connection is set up by the actuations of the magnets 21, 22 and 23 have been completed. When the magnet 23 is energized by pressing the third number of the combination in its proper order, i. e. the button 10, the line 400 will be energized and the lock will be opened.

We have not attempted to show the lock herein, as any type of magnetic lock may be used in connection with this system. As before expressed, this system may be variously utilized for all sorts of purposes, the matter of lock being discussed merely as an important and illustrative form. The device may also be variously wired in manners which will readily occur to those skilled in the art. It is also obvious that various well known electrical contrivances may be substituted for those herein shown, and all without departing from the spirit of our invention if with in the limits of the appended claims.

What we therefore claim and desire to secure by Letters Patent is:—

1. In a lock control system, a plurality of electrically controlled devices successively operable to establish a control circuit, a selective circuit setting device comprising a plurality of switch arms concentrically arranged for movement about a common axis one switch arm being provided for each control device and electrically connected with the respective control devices, a plurality of independent contacts circularly disposed so that each contact is engageable by one or more switch arms to selectively establish the said devices in circuit with any predetermined contacts and exposed independent circuit closers, one for each contact and electrically connected therewith whereby a predetermined circuit combination may be completed to establish or break the control circuit, and an electromagnetic circuit breaker for destroying any previous circuit combination, the circuit for said circuit breaker being dependent upon the setting of one of the arms of the selective circuit setting device and one of the exposed independent circuit closers.

2. A lock control comprising a plurality of electric circuits, a normally open circuit closer for each, a plurality of electromagnets having the circuits thereof electrically interlocked to effect successive operation to establish a control circuit, each electro-magnet when energized being arranged to close a pair of contacts in the circuit of the succeeding electro-magnet to be operated whereby successive operation of the electromagnets is assured, a selective circuit setting device comprising a plurality of switch arms concentrically arranged for movement about a common axis one switch arm being provided for each electromagnet, one of each of said electromagnets being connected to one of each of the selector switch arms, a plurality of independent contacts so arranged that each is engageable by any one or more of said selector switch arms to selectively set the circuit for said electromagnets as to require a predetermined sequence of operations, and a series of push buttons corresponding in number to the contacts of the selector device one of each of the selector contacts being connected to a corresponding push button, whereby any predetermined circuit combination as determined by the set of the circuit selector device, may be built up by successively closing the push buttons in predetermined order to establish the control circuit, and an electromagnetic circuit breaker for destroying any previous circuit combination which may have been established, the circuit for said circuit closer including therein, the contacts of the circuit selector device and the push button circuit, the circuit for said circuit breaker being independent of the circuit for the electromagnets.

3. A lock control comprising a plurality of lines adapted to be electrically energized, an exposed key board therefor, a plurality of push buttons on said board and constituting normally open closers for said lines, a plurality of electro-magnets successively operable to establish a lock circuit, a selective circuit setting device including concentric switch arms one for each electro-magnet and electrically connected therewith, a plurality of circularly arranged independent contacts disposed about the switch arm axis each engageable by any switch arm selectively to establish the said devices in circuit with any predetermined contacts, one of each of said independent contacts being each electrically connected to one of each of the push buttons whereby any desired circuit combination may be built up by successively pressing predetermined buttons in predetermined order to establish the control circuit, and an electro-magnetic circuit breaker for destroying any previous circuit combination which may have been established, the circuit for said electro-magnetic circuit breaker being dependent upon a predetermined setting of the selective circuit setting devices and the pressing of a push button.

4. In a lock control system, a plurality of electrically controlled devices successively operable to establish a control circuit, a selective circuit setting device comprising switch arms concentrically arranged for movement about a common axis, one switch arm being provided for each device, and being electrically connected therewith, a plurality of independent contacts so arranged that each contact is engageable by one or more of said switch arms selectively to establish the said devices in circuit with any predetermined contacts, exposed independent circuit closers, one for each contact and electrically connected therewith whereby any predetermined circuit combination may be completed to establish the control circuit, and an electro-magnetic circuit breaker for destroying any previous circuit combination which may have been established, the circuit for said circuit breaker being dependent upon the position of one of the arms of the selective circuit setting device and one of the independent circuit closers.

In testimony whereof we affix our signatures.

HORACE S. CHASE.
WILLIAM R. FLETCHER.